(12) United States Patent
Nakagawa et al.

(10) Patent No.: US 8,524,124 B2
(45) Date of Patent: *Sep. 3, 2013

(54) DISPERSION OF ZIRCONIUM OXIDE AND PROCESS FOR PRODUCING THE SAME

(75) Inventors: Kenichi Nakagawa, Sakai (JP); Takanori Morita, Sakai (JP)

(73) Assignee: Sakai Chemical Industry Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/142,136

(22) PCT Filed: Dec. 16, 2009

(86) PCT No.: PCT/JP2009/071370
§ 371 (c)(1), (2), (4) Date: Jun. 24, 2011

(87) PCT Pub. No.: WO2010/074105
PCT Pub. Date: Jul. 1, 2010

(65) Prior Publication Data
US 2011/0260122 A1    Oct. 27, 2011

(30) Foreign Application Priority Data

Dec. 24, 2008 (JP) ................. 2008-328604

(51) Int. Cl.
| | |
|---|---|
| *F21V 9/00* | (2006.01) |
| *G02B 7/10* | (2006.01) |
| *G02C 7/10* | (2006.01) |
| *G02F 1/361* | (2006.01) |
| *G03B 11/00* | (2006.01) |
| *C01G 25/02* | (2006.01) |
| *C01G 23/00* | (2006.01) |

(52) U.S. Cl.
USPC ...... 252/582; 106/438; 106/450; 423/594.12; 423/598; 524/413

(58) Field of Classification Search
USPC ............... 106/438, 450; 252/582; 516/88, 516/90; 524/413; 423/594.12, 598
See application file for complete search history.

(56) References Cited

U.S. PATENT DOCUMENTS

| 2008/0242745 A1 | 10/2008 | Morimura |
| 2008/0260624 A1* | 10/2008 | Ikeda et al. ............... 423/598 |
| 2011/0245397 A1* | 10/2011 | Nakagawa et al. ......... 524/413 |

FOREIGN PATENT DOCUMENTS

| JP | 5-51214 | | 3/1993 |
| JP | 2006-143535 | * | 6/2006 |
| JP | 2008-031023 | * | 2/2008 |
| JP | 2008-247619 | | 10/2008 |

OTHER PUBLICATIONS

International Search Report issued Mar. 9, 2010 in International (PCT) Application No. PCT/JP2009/071370.

* cited by examiner

*Primary Examiner* — Bijan Ahvazi
(74) *Attorney, Agent, or Firm* — Wenderoth, Lind & Ponack, L.L.P.

(57) ABSTRACT

The invention provides a process for producing an aqueous dispersion of zirconium oxide comprising: reacting a zirconium salt with an alkali in water to obtain a slurry of particles of zirconium oxide; filtering, washing, and repulping the slurry; adding an organic acid to the resulting slurry in an amount of one mole part or more per mole part of the zirconium in the slurry; hydrothermally treating the resulting mixture at a temperature of 170° C. or higher; and washing the resulting aqueous dispersion of particles of zirconium oxide.

5 Claims, No Drawings

DISPERSION OF ZIRCONIUM OXIDE AND PROCESS FOR PRODUCING THE SAME

TECHNICAL FIELD

The present invention relates to a dispersion of zirconium oxide and a process for producing the same, and more particularly to a dispersion of zirconium oxide which comprises fine particles of zirconium oxide evenly dispersed in a dispersion medium, and which has hence a high transparency, and a process for producing the same. As the dispersion of zirconium oxide of the invention has the properties described above, it is particularly useful as, for example, a material for an optical composite resin, such as an LED sealing resin or an antireflection film.

BACKGROUND ART

Recently, various high-functional resins or films in which zirconium oxide is combined with a transparent resin or film to improve its refractive index by making use of the high refractive index of the zirconium oxide have been proposed.

For example, it is known that when zirconium oxide having a high refractive index is added to an LED sealing resin, the refractive index of the sealing resin can be heightened, and hence it is possible to further efficiently take out emission of light from illuminant, thus resulting in improved brightness of an LED.

Similarly, zirconium oxide is also used in an antireflection film on a display surface of a flat panel display (FPD) such as a liquid crystal display (LCD), a plasma display panel (PDP), or an electroluminescence display (EL). The antireflection film is a laminated film in which a layer having a low refractive index and a layer having a high refractive index are laminated, and a composite resin in which zirconium oxide is dispersed is used in the layer having a high refractive index.

In the uses described above, in the case a primary particle size of zirconium oxide and a secondary particle size of aggregated particles of zirconium oxide in a resin are not sufficiently smaller than a wave length of visible rays (380 to 800 nm), a sealing resin or an antireflection film becomes clouded due to an influence of scattering caused by the particles of zirconium oxide, and thus necessary transparency cannot be obtained. It is therefore strongly required to develop a highly transparent dispersion of zirconium oxide in which the particles of zirconium oxide are dispersed as fine particles in a resin.

In order to meet the requirement, various fine particles of zirconium oxide and processes for producing a dispersion of such fine particles have been recently proposed. A typical process for obtaining a dispersion of zirconium oxide is such that it makes use of zirconium hydroxide produced by neutralizing a zirconium salt with an alkali. For example, a process is known in which hydrochloric acid having a predetermined concentration is added to a slurry of zirconium hydroxide, and the resulting mixture is heated at a boiling temperature to obtain a dispersion of zirconium oxide (Patent Literature 1). According to this process, however, the obtained zirconium oxide has an average particle size of 50 nm or more, and therefore it is difficult that the dispersion has a satisfactory transparency.

A process is also known in which an aqueous solution of a zirconium salt is added to an aqueous solution of an alkali metal hydroxide which has been heated to 60° C. or higher to neutralize the alkali metal hydroxide, that is, reverse neutralization is carried out; then the resulting product is filtered, and washed; and water is added to the product; the resulting mixture is stirred; an acid is added to the mixture; and the resulting mixture is stirred while it is heated at a temperature of 80 to 100° C. to obtain a dispersion of zirconia (Patent Literature 2). According to this process, however, a long heating time is necessary, and therefore it is difficult to adopt the process for industrial production of dispersion of zirconia.

A further process is known in which a zirconium salt is neutralized with an alkali in water in the presence of a carboxylic acid such as malic acid, citric acid, or tartaric acid to obtain a gel of zirconium hydroxide; the gel is once washed and aged, and then sufficiently dispersed by ultrasonic wave irradiation, or the like; and the resulting dispersion is hydrothermally treated in the presence of the carboxylic acid mentioned above to obtain a dispersion of zirconium oxide (Patent Literature 3). However, this process needs many steps, and moreover, it is not easy to wash and remove the carboxylic acid used when the zirconium salt is neutralized. Accordingly, the amount of the carboxylic acid used in the subsequent hydrothermal treatment of the dispersion is not fixed, and as a result, it is difficult to obtain stably a dispersion of zirconium oxide having the same quality. Furthermore, because it is essential to sufficiently perform the dispersion treatment by the ultrasonic wave irradiation or the like before the hydrothermal treatment, it is difficult to adopt the process for an industrial process for production of dispersion of zirconium oxide.

Patent Literature 1: JP 1993-24844 A
Patent Literature 2: JP 2008-31023 A
Patent Literature 3: JP 2006-143535 A

DISCLOSURE OF THE INVENTION

Technical Problems to be Solved

In order to solve the above-mentioned problems involved in the conventional dispersions of zirconium oxide, the present inventors have made studies diligently. As a result, they have found that when a zirconium salt is reacted with an alkali in water to obtain a slurry containing particles of zirconium oxide; the slurry is filtered, washed and repulped; an organic acid is added to the resulting slurry in an amount of one mole part or more per mole part of the zirconium in the slurry; and the slurry is hydrothermally treated at a temperature of 170° C. or higher, and washed; then an aqueous dispersion of zirconium oxide comprising fine particles of zirconium oxide evenly dispersed in water, and hence having an excellent transparency can be obtained.

The inventors have further found that when the medium of the thus obtained aqueous dispersion of zirconium oxide, that is, water is replaced by an organic solvent, a dispersion of zirconium oxide the medium of which dispersion is the organic solvent, and which comprises fine particles of zirconium oxide evenly dispersed in the organic solvent, and hence has a high transparency. Thus, the inventors have accomplished the present invention can be obtained.

Therefore, it is an object of the invention to provide a dispersion of zirconium oxide which comprises fine particles of zirconium oxide evenly dispersed in a dispersion medium and has a high transparency. It is also an object of the invention to provide a process for producing such a dispersion of zirconium oxide.

Means to Solve the Problems

The invention provides a process for producing an aqueous dispersion of zirconium oxide comprising: reacting a zirconium salt with an alkali in water to obtain a slurry of particles of zirconium oxide; filtering, washing, and repulping the slurry; adding an organic acid to the resulting slurry in an amount of one mole part or more per mole part of the zirconium in the slurry; hydrothermally treating the resulting mixture at a temperature of 170° C. or higher; and washing the resulting aqueous dispersion of particles of zirconium oxide.

The invention further provides a process for producing an aqueous dispersion of zirconium oxide comprising: reacting a zirconium salt and a salt of at least one stabilizing element selected from aluminum, magnesium, titanium, and rare earth elements with an alkali in water to obtain a slurry containing particles of a coprecipitate of a zirconium oxide and the at least one stabilizing element; filtering, washing, and repulping the slurry; adding an organic acid to the resulting slurry in an amount of one mole part or more per mole part of a total amount of the zirconium and the at least one stabilizing element in the slurry; hydrothermally treating the resulting mixture at a temperature of 170° C. or higher; and washing the resulting aqueous dispersion of particles of solid solution of zirconium oxide containing the at least one stabilizing element.

In the invention, the coprecipitate of zirconium oxide and the at least one stabilizing element refers to a coprecipitate of zirconium oxide and a neutralization product of a salt of the at least one stabilizing element obtained by reacting a zirconium salt and a salt of the at least one stabilizing element with an alkali in water.

According to the invention, the aqueous dispersion of zirconium oxide obtained by the hydrothermal treatment as mentioned above is preferably washed using an ultrafilter.

Further according to the invention, in the process as mentioned above, a simultaneous neutralization method is preferred in order that the zirconium salt, or the zirconium salt and the salt of the at least one stabilizing element are reacted with an alkali in water. That is, an aqueous solution of a zirconium salt, or a zirconium salt and a salt of at least one stabilizing element selected from aluminum, magnesium, titanium, and rare earth elements, and an aqueous alkaline solution are added at the same time to charged water which has been in advance placed in a precipitation reactor.

In addition, according to the invention, a dispersion medium of such an aqueous dispersion of zirconium oxide as obtained above, that is, water is replaced by an organic solvent, thereby a dispersion of zirconium oxide of which dispersion medium is the organic solvent and which has the properties described above can be obtained.

The invention also provides a dispersion of zirconium oxide obtained as described above.

Effect of the Invention

According to the process of the invention, an aqueous dispersion of zirconium oxide which comprises fine particles of zirconium oxide evenly dispersed in water, and has a high transparency. Furthermore, the dispersion medium of the aqueous dispersion of zirconium oxide as obtained above, that is, water is replaced by an organic solvent, thereby a dispersion of zirconium oxide of which dispersion medium is the organic solvent can be obtained.

The dispersion of zirconium oxide of the invention comprises fine particles of zirconium oxide evenly dispersed in a dispersion medium. Accordingly, when it is used in, for example, an optical product such as an LED sealing resin or an antireflection film, the dispersion can be added to a resin as it is of a high concentration, thereby readily providing a composite resin having a high refractive index and an excellent transparency.

BEST MODE FOR CARRYING OUT THE INVENTION

According to the process of the invention for producing an aqueous dispersion of zirconium oxide, a zirconium salt is reacted with an alkali in water to obtain a slurry of particles of zirconium oxide; then the slurry is filtered, washed, and repulped; an organic acid is added to the resulting slurry in an amount of one mole part or more per mole part of the zirconium in the slurry; the resulting mixture is hydrothermally treated at a temperature of 170° C. or higher; and the resulting aqueous dispersion of zirconium oxide is washed.

Further according to the process of the invention for producing an aqueous dispersion of solid solution of zirconium oxide containing at least one stabilizing element selected from aluminum, magnesium, titanium, and rare earth elements, a zirconium salt and a salt of the at least one stabilizing element mentioned above are reacted with an alkali in water to obtain a slurry of particles of a coprecipitate of zirconium oxide and the at least one stabilizing element; the slurry is filtered, washed, and repulped; an organic acid is added to the resulting slurry in an amount of one mole part or more per mole part of a total amount of the zirconium and the at least one stabilizing element in the slurry; the slurry is hydrothermally treated at a temperature of 170° C. or higher, and the resulting aqueous dispersion is washed.

The zirconium salt used in the invention is not particularly limited, and a water soluble salt such as a nitrate, an acetate and a chloride is used. Of these salts, zirconium oxychloride is preferably used as the zirconium salt. As the alkali, sodium hydroxide, potassium hydroxide, and ammonia are preferably used, but the alkali is not limited thereto.

The salt of the at least one stabilizing element is not particularly limited, and a water soluble salt such as a chloride and a nitrate is usually used. For example, when the at least one stabilizing element is aluminum, aluminum chloride is preferably used; and when the at least one stabilizing element is yttrium, yttrium chloride is preferably used. The at least one stabilizing element is usually used in an amount of 1 to 20% by mole based on the zirconium element.

A temperature at which the zirconium salt, or the zirconium salt and the salt of the at least one stabilizing element are reacted with the alkali in water is not also particularly limited, and the temperature is usually within a range of 10 to 50° C., preferably within a range of 15 to 40° C.

A method for reacting the zirconium salt, or the zirconium salt and the salt of the at least one stabilizing element with the alkali in water may include, for example, a method in which an aqueous solution of alkali is added to an aqueous solution of zirconium salt or to a mixed aqueous solution of the zirconium salt and the salt of the at least one stabilizing element; a method in which the zirconium salt or a mixed aqueous solution of the zirconium salt and the salt of the at least one stabilizing element is added to an aqueous solution of alkali; a method in which an aqueous solution of zirconium salt or a mixed aqueous solution of the zirconium salt and the salt of the at least one stabilizing element, and an aqueous solution of alkali are added to charged water at the same time, that is, a simultaneous neutralization method; and the like. Any of these methods described above may be employed. Of these, the simultaneous neutralization method in which the aqueous solution of zirconium salt or the mixed aqueous solution of the zirconium salt and the salt of the at least one stabilizing element, and the aqueous solution of alkali are added to charged water at the same time is preferable.

The aqueous solution of zirconium salt, for example, the aqueous solution of zirconium oxychloride has preferably a concentration of 2.4 moles/L or less. The aqueous solution of alkali has preferably a concentration of 10 moles/L or less.

According to the invention, as described above, the zirconium salt, or the zirconium salt and the salt of the at least one stabilizing element is/are reacted with the alkali in water thereby a slurry of the particles of zirconium oxide, or a slurry of the particles of a coprecipitate of the zirconium oxide and the at least one stabilizing element is obtained, and then the slurry is filtered, washed, and repulped in water to prepare a second slurry. The thus obtained second slurry has preferably an electric conductivity of 500 μS/cm or less.

In general, when the zirconium salt, for example, zirconium oxychloride is neutralized with, for example, sodium hydroxide in water, a salt or sodium chloride is produced as a by-product. When the salt, for example, sodium chloride by-produced by the reaction of the zirconium salt with the alkali in water is not sufficiently removed from the second slurry, even if the organic acid is added to such a slurry, and the slurry is hydrothermally treated, it is difficult to obtain a satisfactory dispersion effect, and thus a dispersion of zirconium oxide having a high transparency cannot be obtained.

Further according to the invention, in order to obtain the slurry by filtering and washing the previously obtained slurry and repulping the resulting cake in water, the cake may be poured into water and the mixture may be stirred with a stirrer to obtain the slurry. Alternatively, the cake may be repulped in water by a wet media dispersion means such as a beads mill, ultrasonic wave irradiation, or a device such as a high pressure homogenizer, as occasion demands.

As described above, the zirconium salt, or the zirconium salt and the salt of the at least one stabilizing element is/are reacted with the alkali in water thereby providing the slurry of particles of zirconium oxide, or particles of the coprecipitate of the zirconium oxide and the at least one stabilizing element, which usually has a content of 1 to 20% by weight of the particles. When the slurry has a content of the particles of zirconium oxide, or a content of the particles of the coprecipitate of the zirconium oxide and the at least one stabilizing element of more than 20% by weight, the viscosity of the slurry is high, and therefore it is difficult to stir the slurry, thus resulting in insufficient washing. When such a slurry is used, the desired dispersion of zirconium oxide having a high transparency cannot be obtained. In the invention, the content of the particles of zirconium oxide, or the content of the particles of the coprecipitate of the zirconium oxide and the at least one stabilizing element in the slurry is particularly preferably within a range of 1 to 10% by weight.

According to the invention, as set forth above, either the zirconium salt is reacted with the alkali in water thereby obtaining the slurry containing the particles of zirconium oxide, or the zirconium salt and the salt of the at least one stabilizing element are reacted with the alkali in water thereby obtaining the slurry containing the particles of the coprecipitate of the zirconium oxide and the at least one stabilizing element; then the slurry is filtered, washed, and repulped in water; an organic acid is added to the resulting slurry in an amount of one mole part or more per mole part of the zirconium, or per mole part of the total amount of the zirconium and the at least one stabilizing element in the slurry; and the slurry is hydrothermally treated at a temperature of 170° C. or higher.

The slurry to be subjected to the hydrothermal treatment has also a content of particles of zirconium oxide, or a content of particles of the coprecipitate of the zirconium oxide and the at least one stabilizing element of usually 1 to 20% by weight, preferably 1 to 10% by weight. When the content of the particles of zirconium oxide, or the content of the particles of the coprecipitate of the zirconium oxide and the at least one stabilizing element in the slurry is more than 20% by weight, the slurry has a high viscosity, and it is difficult to perform the hydrothermal treatment. Therefore, the content of the particles of zirconium oxide, or the content of the particles of the coprecipitate of the zirconium oxide and the at least one stabilizing element in the slurry is particularly preferably within a range of 1 to 10% by weight.

The organic acid is used in order to disperse the particles of zirconium oxide, or the particles of the coprecipitate of the zirconium oxide and the at least one stabilizing element in the slurry by making the particles to electrically repel each other, in other words, in order to perform acid deflocculation. In particular, according to the invention, the slurry is hydrothermally treated under severe conditions, and therefore the particles of zirconium oxide, or the particles of the coprecipitate of the zirconium oxide and the at least one stabilizing element are more effectively deflocculated.

As the organic acid, a carboxylic acid and a hydroxycarboxylic acid are preferably used, and the salts of the carboxylic acid or the hydroxycarboxylic acid may also be used. Examples of the organic acid may include monocarboxylic acids such as formic acid, acetic acid and propionic acid, and the salts thereof; polybasic acids such as oxalic acid, malonic acid, succinic acid, fumaric acid and maleic acid, and the salts thereof; and hydroxycarboxylic acids such as lactic acid, malic acid, tartaric acid, citric acid and gluconic acid, and the salts thereof. As the salt of the carboxylic acid or the hydroxycarboxylic acid, for example, alkali metal salts such as sodium salts and potassium salts are preferably used.

As mentioned hereinbefore, the organic acid is usually used in an amount of one mole part or more per mole part of the zirconium, or the total amount of the zirconium and the at least one stabilizing element in the slurry to be hydrothermally treated. The amount is preferably from 1 to 5 mole parts, most preferably from 1 to 3 mole parts. When the amount of the organic acid is less than one mole part per mole part of the zirconium, or the total amount of the zirconium and the at least one stabilizing element in the slurry, the resulting aqueous dispersion of zirconium oxide not only has an insufficient transparency but also may have a high viscosity. On the other hand, when the amount of the organic acid is more than 5 mole parts per mole part of the zirconium, or the total amount of the zirconium and the at least one stabilizing element in the slurry, an effect which reflects the large amount used cannot be particularly obtained, and it is not economical.

According to the invention, the slurry of zirconium oxide containing the organic acid, or the slurry of the particles of zirconium oxide and the particles of the coprecipitate of the zirconium oxide and the at least one stabilizing element containing the organic acid is subsequently hydrothermally treated. The hydrothermal treatment is performed at a temperature of usually 170° C. or higher, preferably 170° C. to 230° C. When the hydrothermal treatment is performed at a temperature of less than 170° C., the resulting aqueous dispersion of zirconium oxide does not have a satisfactory transparency, and in addition, it contains coarse, sedimentary and aggregated particles, and may have a high viscosity.

The hydrothermal treatment time is usually one hour or more, preferably 3 hours or more. When the hydrothermal treatment time is shorter than one hour, the resulting aqueous dispersion of zirconium oxide does not have a sufficient transparency, and in addition, coarse, sedimentary and aggregated particles are generated therein, and thus the desired aqueous dispersion of fine particles of zirconium oxide with a high transparency cannot be obtained. Longer hydrothermal treatment times are possible, but an effect which reflects the time spent cannot be obtained, and thus it usually is enough to perform the treatment for 10 hours or shorter.

In order to wash the thus obtained aqueous dispersion of zirconium oxide, a method such as an ion exchange using an ion exchange resin, a diffusion dialysis using a semipermeable membrane, an electrodialysis, or an ultrafiltration using an ultrafilter may be employed. In the invention, the method is not particularly limited; however, of these, it is preferable to wash the dispersion by the ultrafiltration using an ultrafilter.

According to the invention, an aqueous dispersion of zirconium oxide having a content usually of 1-10% by weight of particles of zirconium oxide is obtained in this way. The particles of zirconium oxide in the aqueous dispersion of zirconium oxide obtained as above have a D50 in a range of 2-20 nm, preferably in a range of 3-15 nm. The D50 is a particle size of a particle at which 50% by volume of particles is accumulated from the smallest particle side in a volume based particle size distribution as measured by a dynamic light scattering method. The particles of zirconium oxide in the aqueous dispersion of zirconium oxide as obtained above has also a particle size distribution Dmax of 100 nm or less, preferably 75 nm or less, which is a maximum particle size obtained in a volume based particle size distribution. The aqueous dispersion of zirconium oxide as obtained above has a transmittance of 95% or more at a wave length of 800 nm.

If necessary, the thus washed aqueous dispersion of zirconium oxide is concentrated. For the purpose of concentration, a method such as evaporative concentration using a rotary evaporator, or concentration by ultrafiltration using an ultrafilter may be employed. In the invention, the concentration method is not also particularly limited, and it is preferable to concentrate the dispersion by the ultrafiltration using an ultrafilter.

Therefore, according to the invention, the aqueous dispersion of zirconium oxide obtained by the hydrothermal treatment can be washed at the same time when it is concentrated using the ultrafilter. That is, the aqueous dispersion is concentrated by the ultrafiltration, the resulting concentrated dispersion is diluted with water and washed, and the resulting slurry is subjected to the ultrafiltration again. In this way, the procedure of the concentration by the ultrafiltration and dilution of the aqueous dispersion is repeated, whereby the aqueous dispersion of zirconium oxide obtained by the hydrothermal treatment is concentrated while remaining salts produced as the by-products are repeatedly removed together with water. Thus, the aqueous dispersion of zirconium oxide can be concentrated to have an increased content of zirconium oxide.

Further according to the invention, if necessary, the dispersion obtained by the hydrothermal treatment may be subjected to wet media dispersion using, for example, a beads mill, ultrasonic wave irradiation, or dispersion treatment using a high pressure homogenizer, to obtain a desired aqueous dispersion of zirconium oxide.

According to the invention, the aqueous dispersion of zirconium oxide of which dispersion medium is water can be obtained in this way. When the dispersion medium of the aqueous dispersion thus obtained is replaced by an organic solvent, a dispersion of zirconium oxide of which dispersion medium is the organic solvent, and which has the properties described above, that is, a dispersion of zirconium oxide which comprises fine particles of zirconium oxide evenly dispersed in the organic solvent and has a high transparency can be obtained.

The organic solvent is not particularly limited, and water miscible organic solvents are preferable. The water miscible organic solvent is not particularly limited, and may include, for example, aliphatic alcohols such as methanol, ethanol, and 2-propanol; aliphatic carboxylic acid esters such as ethyl acetate and methyl formate; aliphatic ketones such as acetone, methyl ethyl ketone, and methyl isobutyl ketone; polyhydric alcohols such as ethylene glycol and glycerin; and mixtures of the two or more thereof. Methanol, methyl ethyl ketone, methyl isobutyl ketone, and mixtures thereof are particularly preferable.

In order to replace the dispersion medium of the aqueous dispersion of zirconium oxide obtained, that is water, by the organic solvent, the aqueous dispersion is treated using a rotary evaporator to remove water, and the organic solvent is newly added thereto, for example. As an another method, the aqueous dispersion is subjected to ultrafiltration to remove water or the dispersion medium, to obtain a slurry, the slurry is diluted with an organic solvent, and the ultrafiltration is performed again. In this way, the procedure of filtration and dilution is repeated, whereby water, which is the original dispersion medium, is replaced by the organic solvent, and thus the dispersion of zirconium oxide whose dispersion medium is the organic solvent can be obtained.

As a further method, for example, water which is a dispersion medium of an aqueous dispersion of zirconium oxide is replaced by a water miscible organic solvent to obtain a dispersion of zirconium oxide of which dispersion medium is the water miscible organic solvent, and then the water miscible organic solvent is replaced by another organic solvent, whereby a dispersion of zirconium oxide of which dispersion medium is the another organic solvent can be obtained.

The thus obtained dispersion of zirconium oxide may further be subjected to wet media dispersion using, for example, a beads mill, ultrasonic wave irradiation, or dispersion treatment using a high pressure homogenizer, as occasion demands.

EXAMPLES

The invention will be described with reference to Examples below, but the invention is not limited thereto.

Hereinafter in Examples, "Microza" (ACP-0013, a fractional molecular weight of 13000) manufactured by Asahi Kasei Chemicals Corporation was used for ultrafiltration.

A dispersion size of dispersion of zirconium oxide was measured in accordance with a dynamic light scattering method (using UPA-UT manufactured by Nikkiso Co., Ltd.). Here, the dispersion size refers to a size (a diameter) of particles dispersed in dispersion. A transmittance of dispersion of zirconium oxide was measured by putting the dispersion in a cell having a light path length of 10 mm, and using a visible-ultraviolet spectrophotometer (V-570 manufactured by JASCO Corporation). A viscosity of dispersion of zirconium oxide was measured using a turning-fork vibration SV viscometer (SV-1A manufactured by A & D Company, limited).

Example 1

(Dispersion of Zirconium Oxide A)

0.76 L of a mixed aqueous solution of zirconium oxychloride in a concentration of 0.6 mole/L and yttrium chloride in a concentration of 0.03 mole/L, as well as 0.53 L of an aqueous solution of sodium hydroxide having a concentration of 1.9 moles/L were prepared. The mixed aqueous solution of the zirconium oxychloride and the yttrium chloride, and the aqueous solution of the sodium hydroxide were poured at the same time into a precipitation reactor into which 0.74 L of pure water had been in advance put, thereby the zirconium oxychloride and the yttrium chloride were neutralized at the same time to be coprecipitated, and thus a slurry of particles of a coprecipitate of the zirconium oxide and the yttrium was obtained. The slurry was filtered, washed, and repulped in pure water so that one liter of a slurry was obtained of which solid content was 5.6% by weight in terms of zirconium oxide and yttrium oxide. The slurry had an electric conductivity of 235 μS/cm.

86.3 g (3 mole parts per mole part of total amount of the zirconium and the yttrium in the slurry) of acetic acid was added to the slurry, and the resulting mixture was hydrothermally treated at 200° C. for 3 hours to obtain a translucent dispersion. The translucent dispersion was washed using an ultrafilter to obtain a dispersion A having a content of 5% by weight of solid solution of zirconium oxide containing yttrium.

(Dispersion of Zirconium Oxide B)

0.76 L of a mixed aqueous solution of zirconium oxychloride in a concentration of 0.6 mole/L and yttrium chloride in a concentration of 0.03 mole/L, as well as 0.53 L of an aqueous solution of sodium hydroxide having a concentration of 1.9 moles/L were prepared. The mixed aqueous solution of the zirconium oxychloride and the yttrium chloride, and the aqueous solution of the sodium hydroxide were poured at the same time into a precipitation reactor into which 0.74 L of pure water had been put, thereby the zirconium oxychloride and the yttrium chloride were neutralized at the same time to be coprecipitated, and thus a slurry of particles of a coprecipitate of the zirconium oxide and the yttrium was obtained. The slurry was filtered, washed, and repulped in pure water so that one liter of a slurry was obtained of which solid content was 5.6% by weight in terms of zirconium oxide and yttrium oxide. The slurry had an electric conductivity of 235 μS/cm.

86.3 g (3 mole parts per mole part of total amount of the zirconium and the yttrium in the slurry) of acetic acid was added to the slurry, and the resulting mixture was hydrothermally treated at 230° C. for 3 hours to obtain a translucent dispersion. The translucent dispersion was washed using an ultrafilter to obtain a dispersion B having a content of 5% by weight of solid solution of zirconium oxide containing yttrium.

(Dispersion of Zirconium Oxide C)

0.76 L of an aqueous solution of zirconium oxychloride in a concentration of 0.6 mole/L and 0.53 L of an aqueous solution of sodium hydroxide having a concentration of 1.7 moles/L were prepared. The aqueous solution of the zirconium oxychloride and the aqueous solution of the sodium hydroxide were poured at the same time into a precipitation reactor into which 0.74 L of pure water had been put, thereby the zirconium oxychloride was neutralized, and thus a slurry of particles of zirconium oxide was obtained. The slurry was filtered, washed, and repulped in pure water so that one liter of a slurry was obtained of which solid content of zirconium oxide was 5.6% by weight. The slurry had an electric conductivity of 258 μS/cm.

82.2 g (3 mole parts per mole part of the zirconium in the slurry) of acetic acid was added to the slurry, and the resulting mixture was hydrothermally treated at 200° C. for 3 hours to obtain a translucent dispersion. The translucent dispersion was washed using an ultrafilter to obtain a dispersion C having a content of 5% by weight of zirconium oxide.

(Dispersion of Zirconium Oxide D)

0.76 L of a mixed aqueous solution of zirconium oxychloride in a concentration of 0.6 mole/L and aluminum chloride in a concentration of 0.03 mole/L, as well as 0.53 L of an aqueous solution of sodium hydroxide having a concentration of 1.9 moles/L were prepared. The mixed aqueous solution of the zirconium oxychloride and the aluminum chloride, and the aqueous solution of the sodium hydroxide were poured at the same time into a precipitation reactor into which 0.74 L of pure water had been put, thereby the zirconium oxychloride and the aluminum chloride were neutralized at the same time to be coprecipitated, and thus a slurry of particles of a coprecipitate of the zirconium oxide and the aluminum was obtained. The slurry was filtered, washed, and repulped in pure water so that one liter of a slurry was obtained of which solid content was 5.5% by weight in terms of zirconium oxide and aluminum oxide. The slurry had an electric conductivity of 173 μS/cm.

86.3 g (3 mole parts per mole part of total amount of the zirconium and the aluminum in the slurry) of acetic acid was added to the slurry, and the resulting mixture was hydrothermally treated at 200° C. for 3 hours to obtain a translucent dispersion. The translucent dispersion was washed using an ultrafilter to obtain a dispersion D having a content of 5% by weight of solid solution of zirconium oxide containing aluminum.

(Dispersion of Zirconium Oxide E)

0.76 L of a mixed aqueous solution of zirconium oxychloride in a concentration of 0.6 mole/L and magnesium chloride in a concentration of 0.03 mole/L, as well as 0.53 L of an aqueous solution of sodium hydroxide having a concentration of 1.8 moles/L were prepared. The mixed aqueous solution of the zirconium oxychloride and the magnesium chloride, and the aqueous solution of the sodium hydroxide were poured at the same time into a precipitation reactor into which 0.74 L of pure water had been put, thereby the zirconium oxychloride and the magnesium chloride were neutralized at the same time to be coprecipitated, and thus a slurry of particles of a coprecipitate of the zirconium oxide and the magnesium was obtained. The slurry was filtered, washed, and repulped in pure water so that one liter of a slurry was obtained of which solid content was 5.5% by weight in terms of zirconium oxide and magnesium oxide. The slurry had an electric conductivity of 156 μS/cm.

86.3 g (3 mole parts per mole part of total amount of the zirconium and the magnesium in the slurry) of acetic acid was added to the slurry, and the resulting mixture was hydrothermally treated at 200° C. for 3 hours to obtain a cloudy dispersion. The cloudy dispersion was washed using an ultrafilter to obtain a dispersion having a content of 5% by weight of solid solution of zirconium oxide containing magnesium. The dispersion was further subjected to wet media dispersion treatment to obtain a dispersion E having a content of 5% by weight of zirconium oxide.

(Dispersion of Zirconium Oxide F)

0.76 L of a mixed aqueous solution of zirconium oxychloride in a concentration of 0.6 mole/L and titanium tetrachloride in a concentration of 0.03 mole/L, as well as 0.53 L of an aqueous solution of sodium hydroxide having a concentration of 1.9 moles/L were prepared. The mixed aqueous solution of the zirconium oxychloride and the titanium tetrachloride, and the aqueous solution of the sodium hydroxide were poured at the same time into a precipitation reactor into which 0.74 L of pure water had been put, thereby the zirconium oxychloride and the titanium tetrachloride were neutralized at the same time to be coprecipitated, and thus a slurry of particles of a coprecipitate of the zirconium oxide and the titanium was obtained. The slurry was filtered, washed, and repulped in pure water so that one liter of a slurry was obtained of which solid content was 5.5% by weight in terms of zirconium oxide and titanium oxide. The slurry had an electric conductivity of 392 μS/cm.

86.3 g (3 mole parts per mole part of total amount of the zirconium and the titanium in the slurry) of acetic acid was added to the slurry, and the resulting mixture was hydrothermally treated at 200° C. for 3 hours to obtain a cloudy dispersion. The cloudy dispersion was washed using an ultrafilter to obtain a dispersion of a content of 5% by weight of solid solution of zirconium oxide containing titanium. The dispersion was further subjected to wet media dispersion treatment to obtain a dispersion F having a content of 5% by weight of zirconium oxide.

(Dispersion of Zirconium Oxide G)

0.76 L of a mixed aqueous solution of zirconium oxychloride in a concentration of 0.6 mole/L and yttrium chloride in a concentration of 0.03 mole/L, as well as 0.53 L of an aqueous solution of sodium hydroxide having a concentration of 1.9 moles/L were prepared. The mixed aqueous solution of the zirconium oxychloride and the yttrium chloride, and the aqueous solution of the sodium hydroxide were poured at the same time into a precipitation reactor into which 0.74 L of pure water had been put, thereby the zirconium oxychloride and the yttrium chloride were neutralized at the same time to be coprecipitated, and thus a slurry of particles of a coprecipitate of the zirconium oxide and the yttrium was obtained. The slurry was filtered, washed, and repulped in pure water so that one liter of a slurry was obtained of which solid content was 5.6% by weight in terms of zirconium oxide and yttrium oxide. The slurry had an electric conductivity of 235 μS/cm.

140.8 g (1 mole part per mole part of total amount of the zirconium and the yttrium in the slurry) of sodium citrate dihydrate was added to the slurry, and the resulting mixture was hydrothermally treated at 200° C. for 3 hours to obtain a translucent dispersion. The translucent dispersion was washed using an ultrafilter to obtain a dispersion G having a content of 5% by weight of solid solution of zirconium oxide containing yttrium.

(Dispersion of Zirconium Oxide H)

The dispersion of zirconium oxide A having a content of 5% by weight of zirconium oxide was diluted with methanol to a content of 2.5% by weight of zirconium oxide, and concentrated again using an ultrafilter to a content of 5% by weight of zirconium oxide. The dilution and concentration procedure were repeated five times to obtain a dispersion H of which dispersion medium was methanol and which had a content of 5% by weight of zirconium oxide.

(Dispersion of Zirconium Oxide I)

The dispersion of zirconium oxide H having a content of 5% by weight of zirconium oxide was diluted with methyl ethyl ketone to a content of 2.5% by weight of zirconium oxide, and concentrated again using a rotary evaporator to a content of 5% by weight of zirconium oxide. The dilution and concentration procedure were repeated five times to obtain a dispersion I of which dispersion medium was methyl ethyl ketone and which had a content of 5% by weight of zirconium oxide.

Comparative Example 1

(Dispersion of Zirconium Oxide I)

0.76 L of a mixed aqueous solution of zirconium oxychloride in a concentration of 0.6 mole/L and yttrium chloride in a concentration of 0.03 mole/L, as well as 0.53 L of an aqueous solution of sodium hydroxide in a concentration of 1.9 mole/L were prepared. The mixed aqueous solution of the zirconium oxychloride and the yttrium chloride, and the aqueous solution of the sodium hydroxide were poured at the same time into a precipitation reactor into which 0.74 L of pure water had been put, thereby the zirconium oxychloride and the yttrium chloride were neutralized at the same time to be coprecipitated, and thus a slurry of particles of a coprecipitate of the zirconium oxide and the yttrium was obtained. The slurry was filtered, washed, and repulped in pure water so that one liter of a slurry was obtained of which solid content was 5.6% by weight in terms of the zirconium oxide and the yttrium oxide. The slurry had an electric conductivity of 235 μS/cm.

86.3 g (3 mole parts per mole part of total amount of the zirconium and the yttrium in the slurry) of acetic acid was added to the slurry, and the resulting mixture was hydrothermally treated at 150° C. for 3 hours to obtain a translucent dispersion having a content of 5% by weight of solid solution of zirconium oxide containing yttrium. The dispersion was further subjected to wet media dispersion treatment to obtain a dispersion I having a content of 5% by weight of zirconium oxide.

(Dispersion of Zirconium Oxide II)

0.76 L of a mixed aqueous solution of zirconium oxychloride in a concentration of 0.6 mole/L and yttrium chloride in a concentration of 0.03 mole/L, as well as 0.53 L of an aqueous solution of sodium hydroxide in a concentration of 1.9 mole/L were prepared. The mixed aqueous solution of the zirconium oxychloride and the yttrium chloride, and the aqueous solution of the sodium hydroxide were poured at the same time into a precipitation reactor into which 0.74 L of pure water had been put, thereby the zirconium oxychloride and the yttrium chloride were neutralized at the same time to be coprecipitated, and thus a slurry of particles of a coprecipitate of the zirconium oxide and the yttrium was obtained. The slurry was filtered, washed, and repulped in pure water so that one liter of a slurry was obtained of which solid content was 5.6% by weight in terms of the zirconium oxide and the yttrium oxide. The slurry had an electric conductivity of 235 μS/cm.

14.4 g (0.5 mole parts per mole part of total amount of the zirconium and the yttrium in the slurry) of acetic acid was added to the slurry, and the resulting mixture was hydrothermally treated at 200° C. for 3 hours to obtain a cloudy dispersion. The cloudy dispersion was washed using an ultrafilter to obtain a dispersion having a content of 5% by weight of solid solution of zirconium oxide containing yttrium. The dispersion was further subjected to wet media dispersion treatment to obtain a dispersion II having a content of 5% by weight of zirconium oxide.

(Dispersion of Zirconium Oxide III)

0.76 L of a mixed aqueous solution of zirconium oxychloride in a concentration of 0.6 mole/L and yttrium chloride in a concentration of 0.03 mole/L, as well as 0.53 L of an aqueous solution of sodium hydroxide in a concentration of 1.9 mole/L were prepared. The mixed aqueous solution of the zirconium oxychloride and the yttrium chloride, and the aqueous solution of the sodium hydroxide were poured at the same time into a precipitation reactor into which 0.74 L of pure water had been put, thereby the zirconium oxychloride and the yttrium chloride were neutralized at the same time to be coprecipitated, and thus a slurry of particles of a coprecipitate of the zirconium oxide and the yttrium was obtained. The slurry was filtered, washed, and repulped in pure water so that one liter of a slurry was obtained of which solid content was 5.6% by weight in terms of the zirconium oxide and the yttrium oxide. The slurry had an electric conductivity of 235 µS/cm.

140.8 g (1 mole part per mole part of total amount of the zirconium and the yttrium in the slurry) of sodium citrate dihydrate was added to the slurry, and the resulting mixture was hydrothermally treated at 150° C. for 3 hours to obtain a cloudy and sedimentary slurry. The slurry was washed using an ultrafilter so that it had a content of 5% by weight of solid solution of zirconium oxide containing yttrium. The resulting was further subjected to wet media dispersion treatment to obtain a dispersion III having a content of 5% by weight of zirconium oxide.

(Dispersion of Zirconium Oxide IV)

0.76 L of a mixed aqueous solution of zirconium oxychloride in a concentration of 0.6 mole/L and yttrium chloride in a concentration of 0.03 mole/L, as well as 0.53 L of an aqueous solution of sodium hydroxide in a concentration of 1.9 mole/L were prepared. The mixed aqueous solution of the zirconium oxychloride and the yttrium chloride, and the aqueous solution of the sodium hydroxide were poured at the same time into a precipitation reactor into which 0.74 L of pure water had been put, thereby the zirconium oxychloride and the yttrium chloride were neutralized at the same time to be coprecipitated, and thus a slurry of particles of a coprecipitate of the zirconium oxide and the yttrium was obtained. The slurry was filtered, washed, and repulped in pure water so that one liter of a slurry was obtained of which solid content was 5.6% by weight in terms of the zirconium oxide and the yttrium oxide. The slurry had an electric conductivity of 235 µS/cm.

70.4 g (0.5 mole parts per mole part of total amount of the zirconium and the yttrium in the slurry) of sodium citrate dihydrate was added to the slurry, and the resulting mixture was hydrothermally treated at 200° C. for 3 hours to obtain a cloudy dispersion. The cloudy dispersion was washed using an ultrafilter so that it had a content of 5% by weight of solid solution of zirconium oxide containing yttrium. The resulting dispersion was further subjected to wet media dispersion treatment to obtain a dispersion IV having a content of 5% by weight of zirconium oxide.

Transmittances and viscosities of dispersions of zirconium oxide A to I of the invention are shown in Table 1, and transmittances and viscosities of dispersions of zirconium oxide I to IV of Comparative Example are shown in Table 2.

In Table 1 and Table 2, a particle size distribution D50 shows a particle size of a particle at which 50% by volume of particles was accumulated from the smallest particle side in a volume based particle size distribution, and a particle size distribution Dmax shows a maximum particle size obtained in a volume based particle size distribution.

TABLE 1

| | Example 1 | | | | | | | | |
|---|---|---|---|---|---|---|---|---|---|
| | A | B | C | D | E | F | G | H | I |
| Production of Dispersion | | | | | | | | | |
| Stabilizing element | Y | Y | None | Al | Mg | Ti | Y | Y | Y |
| Dispersion medium | Water | Water | Water | Water | Water | Water | Water | Methanol | Methyl ethyl ketone |
| Organic acid | Acetic acid | Acetic acid | Acetic acid | Acetic acid | Acetic acid | Acetic acid | Sodium citrate | Acetic acid | Acetic acid |
| Amount of organic acid (mole part)[1] | 3 | 3 | 3 | 3 | 3 | 3 | 1 | 3 | 3 |
| Hydrothermal treating temperature (° C.) | 200 | 230 | 200 | 200 | 200 | 200 | 200 | 200 | 200 |
| Properties of Dispersion | | | | | | | | | |
| Content of zirconium oxide (% by weight) | 5 | 5 | 5 | 5 | 5 | 5 | 5 | 5 | 5 |
| Particle size distribution D50 (nm) | 6.8 | 5.2 | 8.6 | 11.9 | 8.4 | 7.4 | 9.7 | 5.4 | 9.0 |
| Particle size distribution Dmax (nm) | 21.5 | 30.4 | 25.6 | 51.1 | 21.5 | 43.0 | 30.4 | 25.6 | 30.4 |
| Transmittance at wave length of 800 nm (%) | 98.51 | 97.87 | 96.11 | 95.28 | 95.93 | 95.43 | 97.10 | 97.73 | 95.83 |
| Transmittance at wave length of 400 nm (%) | 74.08 | 72.08 | 72.79 | 41.78 | 51.80 | 44.35 | 70.93 | 69.38 | 62.80 |
| Viscosity at 25° C. (mPa · s) | 1.28 | 2.12 | 1.47 | 1.68 | 1.40 | 1.50 | 1.64 | 1.89 | 2.54 |

(Notes)
[1] Mole parts per mole part of zirconium (and stabilizing element)

TABLE 2

| | Comparative Example 1 | | | |
|---|---|---|---|---|
| | I | II | III | IV |
| Production of Dispersion | | | | |
| Stabilizing element | Y | Y | Y | Y |
| Dispersion medium | Water | Water | Water | Water |
| Organic acid | Acetic acid | Acetic acid | Sodium citrate | Sodium citrate |
| Amount of organic acid (mole part)[1] | 3 | 0.5 | 1 | 0.5 |
| Hydrothermal treating temperature (° C.) | 150 | 200 | 150 | 200 |
| Properties of Dispersion | | | | |
| Content of zirconium oxide (% by weight) | 5 | 5 | 5 | 5 |
| Particle size distribution D50 (nm) | 10.4 | 204.4 | 2780 | 15.4 |
| Particle size distribution Dmax (nm) | 5500 | 972.9 | 4240 | 102.2 |
| Transmittance at wave length of 800 nm (%) | 62.3 | 1.18 | 0.00 | 53.91 |
| Transmittance at wave length of 400 nm (%) | 5.7 | 0.0 | 0.0 | 3.24 |
| Viscosity at 25° C. (mPa · s) | 3.64 | 6.17 | 1.29 | 0.88 |

(Notes)
[1] Mole part per mole part of zirconium (and stabilizing element)

The invention claimed is:

1. A process for producing an aqueous dispersion of zirconium oxide comprising:
    reacting a zirconium salt and a salt of at least one stabilizing element selected from the group consisting of aluminum, magnesium, titanium, and rare earth elements with an alkali in water at a temperature in the range of 10° C. to 50° C., wherein a slurry is obtained containing particles of a coprecipitate of a zirconium oxide and the at least one stabilizing element;

filtering, washing, and repulping the slurry;

adding an organic acid to the resulting slurry in an amount of one mole part or more per mole part of a total amount of the zirconium and the at least one stabilizing element in the slurry;

hydrothermally treating the resulting mixture at a temperature of 170° C. or higher; and washing the resulting aqueous dispersion of particles of solid solution of zirconium oxide containing the at least one stabilizing element, wherein the salt of the at least one stabilizing element is used in an amount from 1 to 20% by mole in terms of the at least one stabilizing element based on the zirconium element, and wherein, when the zirconium salt and the salt of the at least one stabilizing element are reacted with an alkali in water, either
   an aqueous solution of the alkali is added to a mixed aqueous solution of the zirconium salt and the salt of the at least one stabilizing element, or
   a mixed aqueous solution of the zirconium salt and the salt of the at least one stabilizing element and an aqueous solution of an alkali are added at the same time to charged water which has been placed in a precipitation reactor in advance.

2. The process for producing an aqueous dispersion of zirconium oxide according to claim 1, wherein the aqueous dispersion of zirconium oxide obtained by the hydrothermal treatment is washed using an ultrafilter.

3. The process for producing an aqueous dispersion of zirconium oxide according to claim 1, wherein the aqueous dispersion of zirconium oxide obtained is further subjected to dispersion treatment.

4. A process for producing a dispersion of zirconium oxide of which dispersion medium is an organic solvent, the process comprising replacing the dispersion medium of the aqueous dispersion of zirconium oxide obtained by the process according to claim 1 by the organic solvent.

5. The process according to claim 1, wherein the resulting mixture is hydrothermally heated at a temperature in the range of 170° C. to 230° C.

* * * * *